March 31, 1970  J. GACHOT ETAL  3,503,651
COMPRESSED-AIR BRAKE SYSTEM FOR MOTOR VEHICLES
Filed Nov. 4, 1968  7 Sheets-Sheet 3
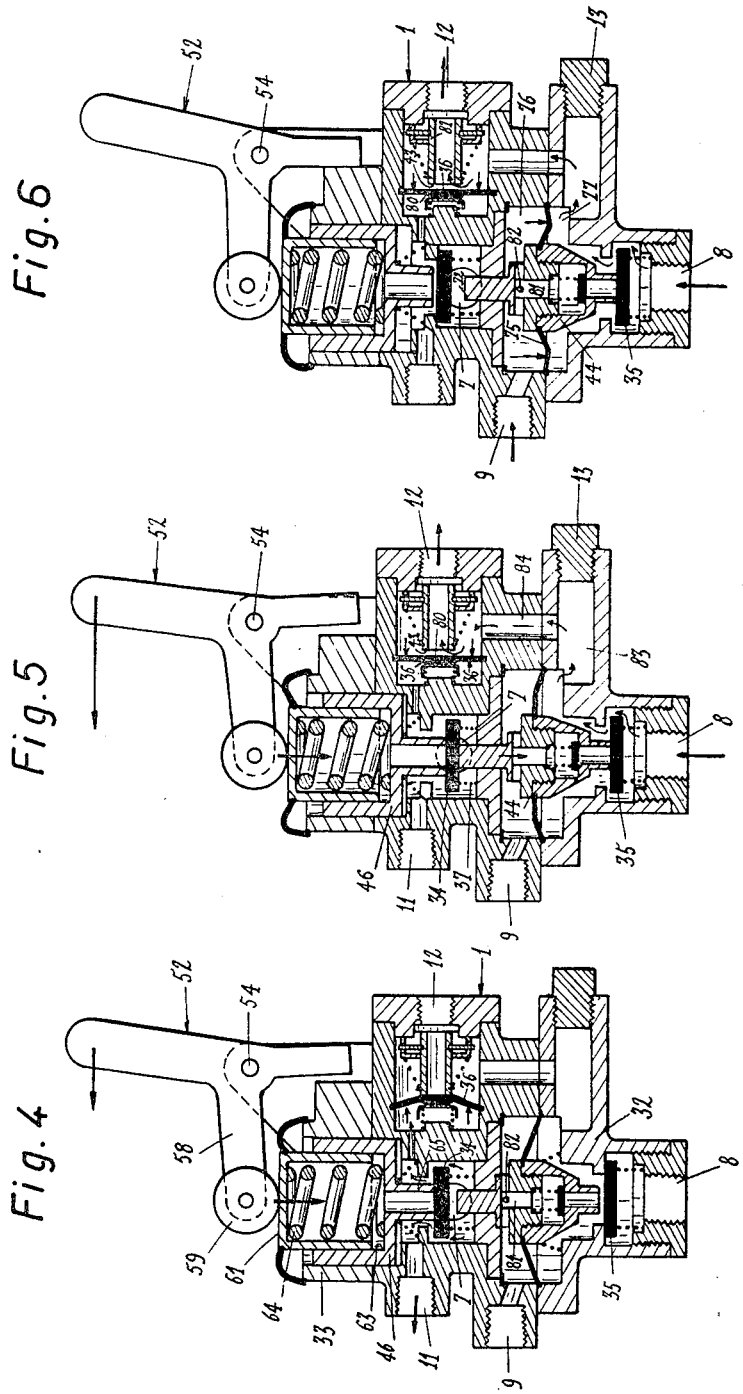

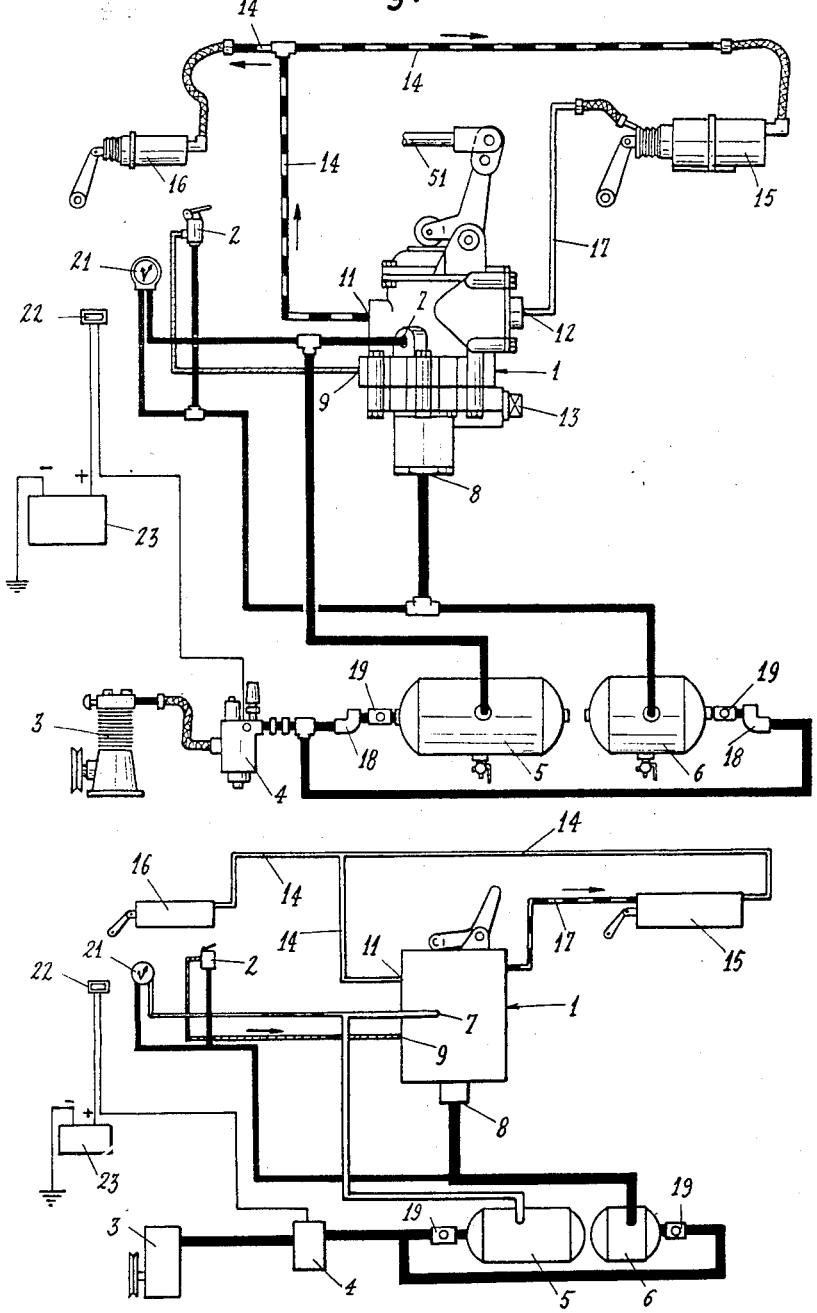

March 31, 1970   J. GACHOT ETAL   3,503,651
COMPRESSED-AIR BRAKE SYSTEM FOR MOTOR VEHICLES
Filed Nov. 4, 1968   7 Sheets-Sheet 4
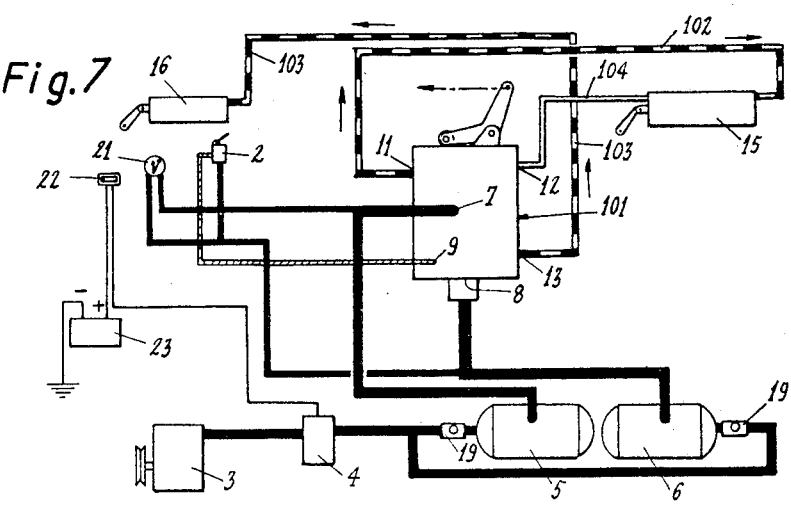
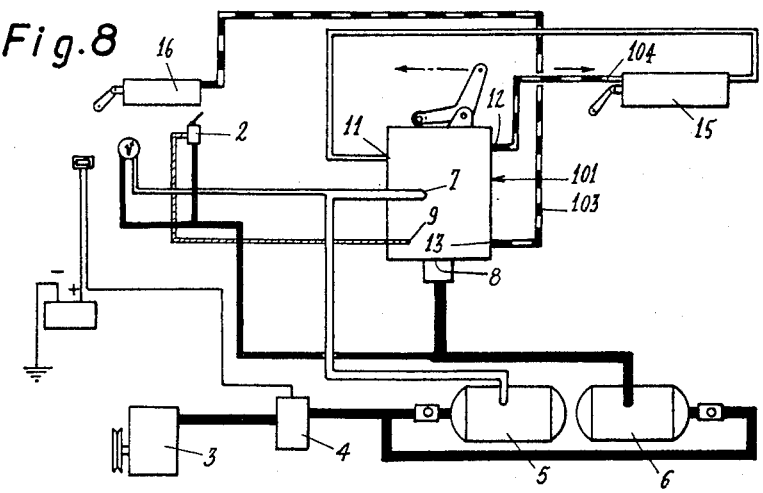
INVENTORS
JEAN GACHOT
FERNAND PERALES
By Young + Thompson
ATTYS March 31, 1970 J. GACHOT ETAL 3,503,651
COMPRESSED-AIR BRAKE SYSTEM FOR MOTOR VEHICLES
Filed Nov. 4, 1968 7 Sheets-Sheet 5

INVENTORS
JEAN GACHOT
FERNAND PERALES
By Young + Thompson
ATTYS.

INVENTORS
JEAN GACHOT
FERNAND PERALES
BY Young + Thompson
ATTYS.

United States Patent Office 3,503,651
Patented Mar. 31, 1970

3,503,651
COMPRESSED-AIR BRAKE SYSTEM FOR
MOTOR VEHICLES
Jean Gachot, 179 Avenue de la Division Leclerc, Enghien,
and Fernand Perales, 87 Rue A.G. Belin, Argenteuil,
both of Val-d' Oise, France
Filed Nov. 4, 1968, Ser. No. 772,918
Claims priority, application France, Nov. 8, 1967,
127,393
Int. Cl. B60t 13/36, 13/38
U.S. Cl. 303—9                                11 Claims

ABSTRACT OF THE DISCLOSURE

A compressed-air brake system for motor vehicles which comprises service application circuits for initiating brake application at the rear wheels and front wheels either in parallel or separately and an emergency application circuit for initiating brake application at least at the rear wheels, said system additionally comprising at least two separate reservoirs for supplying said circuits and a brake-actuating unit provided with a master piston actuated by the brake pedal and adapted to open mechanically in its first then in its second operating position two check-valves assigned to the service application and emergency application circuits, the second check-valve being opened mechanically by the master piston only if the pressure within the service application circuit falls below a predetermined value. The brake-actuating unit comprises a third check-valve for admission of compressed air to the rear-wheel emergency application circuit, said third check-valve being controlled by the differential pressure between the service application circuit which is supplied from the first reservoir and the rear-wheel emergency application circuit which is supplied from the second reservoir.

---

The present invention relates to a brake system for motor vehicles such as buses and motor coaches, trucks and lorries, trailers or semitrailers. This system comprises a brake-actuating unit interposed between two compressed-air reservoirs which are supplied through a compressor, and a system of fluid-circuits which supply respectively the normal-service or "service" brake cylinders and the "emergency" brake cylinders of the different sets of wheels.

It is known to construct brake systems in which the actuating unit comprises a master piston actuated by the brake pedal, the design function of said piston being to initiate successively in the course of its displacement the opening of two check-valves which establish a communication respectively between the compressed-air admission openings which are connected to two reservoirs and the service brake-application and emergency brake-application circuits. However, the check-valve whose opening initiates the operation of the emergency brakes cannot be opened as long as the service braking pressure remains higher than a predetermined value. The driver of the vehicle thus has at his disposal at all times two independent brake circuits of identical efficiency which can be put into operation simply by applying a progressive pressure on a single brake pedal.

Brake systems of this type which have a single pedal control provide a considerable improvement over devices in which emergency brake action is initiated by means of a manual control valve since such systems correspond to the natural reflexes of the driver which consist in depressing the brake pedal to the end of travel in the event of failure of the service brake system.

However, brake systems of this type must in addition meet stringent conditions inasmuch as they must permit the application of a predominant braking force at the rear wheels of the vehicle with respect to the front wheels. Moreover, the actuating unit must be designed so that operation of the second check-valve does not result in damage to the first check-valve. The brake system which is contemplated by the invention meets these conditions.

In brake systems of the centralized-control type, the brakes may fail if, for any reason, the brake pedal is accidentally jammed by a foreign object or if the link-rod system which connects said pedal to the actuating unit should happen to break. The pneumatic braking system of the vehicle is then entirely lost.

In order to circumvent this danger in the case of an actuating unit of this type which is primarily intended for service application at the front and rear sets of wheels, a known expedient consists in adding to the unit a hand-operated auxiliary control valve which provides the driver of the vehicle with independent emergency braking means for the rear sets of wheels. However, the disadvantage of this system is that it entails the use of a third compressed-air reservoir as well as independent fluid-circuits and cylinders which further increase the cost of the brake equipment. Furthermore, the auxiliary braking power which is thus provided usually corresponds only to a fraction of the maximum load of the vehicle. A further object of the invention is therefore to overcome these disadvantages.

In accordance with the invention, the compressed-air brake system for motor vehicles which comprises service application circuits for initiating brake application at the rear wheels and front wheels either in parallel or separately and an emergency application circuit for initiating brake application at least at the rear wheels, said system additionally comprising at least two separate reservoirs for supplying said circuits and a brake-actuating unit provided with a master piston actuated by the brake pedal and adapted to open mechanically in its first then in its second operating position two check-valves assigned to the service application and emergency application circuits, the second check-valve being arranged to be opened mechanically by the master piston only if the pressure within the service application circuit falls below a predetermined value, is characterized in that the brake-actuating unit comprises a third check-valve for admission of compressed air to the rear-wheel emergency application circuit, said third check-valve being controlled by the differential pressure between the service application circuit which is supplied from the first reservoir and the rear-wheel emergency application circuit which is supplied from the second reservoir.

Under these conditions, when the second check-valve is actuated, the compressed air is admitted into the emergency circuit only if the third check-valve is open, which takes place only if the pressure within the service application circuit is lower than the pressure which prevails within the emergency application circuit.

In a preferred embodiment of the invention, the third check-valve is controlled by a flexible diaphragm constituting the movable wall of a differential pressure chamber formed in the brake-actuating unit, said diaphragm being subjected on one side to the pressure of the service application circuit which is supplied from the first reservoir and on the other side to the pressure of the emergency application circuit which is supplied from the second reservoir.

In an advantageous embodiment of the invention, the second check-valve of the actuating unit is coaxial with the first check-valve and actuated mechanically by the master piston in the second operating position of this latter by means of an intermediate piston supported by a flexible diaphragm which ensures leak-tightness of said second check-valve.

According to another feature of the invention, the brake system further comprises a manual-control emergency brake valve which is incorporated with the actuating unit. Said control valve makes it possible in the event of failure of the brake pedal to apply the pressure of the second reservoir to a supplementary admission opening of the actuating unit; this pressure is then exerted on the diaphragm of the intermediate piston which carries out the opening of the second check-valve solely by means of pneumatic action, thereby ensuring emergency brake application at the rear wheels without operation of the brake pedal and master piston.

In an advantageous embodiment which is of particular interest in the case of vehicles having a rated weight in excess of 16 tons, the actuating unit supplies the rear-wheel service-application circuit alone by means of the first reservoir and in the first operating position of the master piston. Said unit is additionally provided at the outlet of the second check-valve with an additional opening through which compressed air derived from the second reservoir can be delivered to the front-wheel application circuit. Said second check-valve is opened pneumatically in the first operating position of the master piston and mechanically in the second operating position of the master piston. The result thereby achieved is that the second reservoir ensures the supply to the front brake cylinders either in normal service or in emergency operation. As in the case of the previous embodiment, the rear emergency brake system is actuated by the third check-valve only if the pressure of the service application circuit falls below a predetermined value.

In accordance with a particular feature of the invention as applicable to the foregoing embodiment, the intermediate piston is connected to two flexible sealing diaphragms mounted one above the other. Said piston is additionally made up of two coaxial elements which are mounted to form a telescopic assembly with interposition of a seal which is placed between the two diaphragms.

Under these conditions, there can be incorporated with the actuating unit as in the previous embodiment an emergency control valve whose outlet is connected to an admission port having its opening between the two diaphragms which support the intermediate piston. By actuating the control valve, the two constituent elements of the piston are separated, thereby opening the second check-valve. This is equivalent to a virtual release of the brake pedal and permits of brake application both at the front and rear wheels as a result of operation of the second check-valve and third check-valve.

Further characteristics of the present invention will be brought out by the following description, reference being made to the accompanying drawings which are given solely by way of illustrative example, and in which:

FIG. 1 illustrates a simple brake system comprising two fluid-circuits whereby brake application at the front and rear wheels of the vehicle by depression of the brake pedal is carried out in normal service by means of a first circuit;

FIG. 2 illustrates the same system whereby brake application at the rear wheels of the vehicle is carried out in emergency operation by means of the second circuit;

FIG. 4 is a diagrammatic longitudinal sectional view of the same unit as shown in the service-applicaton position;

FIG. 5 is a longitudinal sectional view of the same unit as shown in the position of emergency application by foot control;

FIG. 6 is a partial longitudinal sectional view of the same unit as shown in the position of emergency application by pneumatic control;

FIG. 7 illustrates a composite brake system whereby service application at the front and rear wheels of the vehicle is carried out by means of two separate circuits and by depression of the brake pedal;

FIG. 8 illustrates the same system whereby emergency application at the front and rear wheels of the vehicle is carried out by means of two separate circuits and by foot control;

Figure 3:
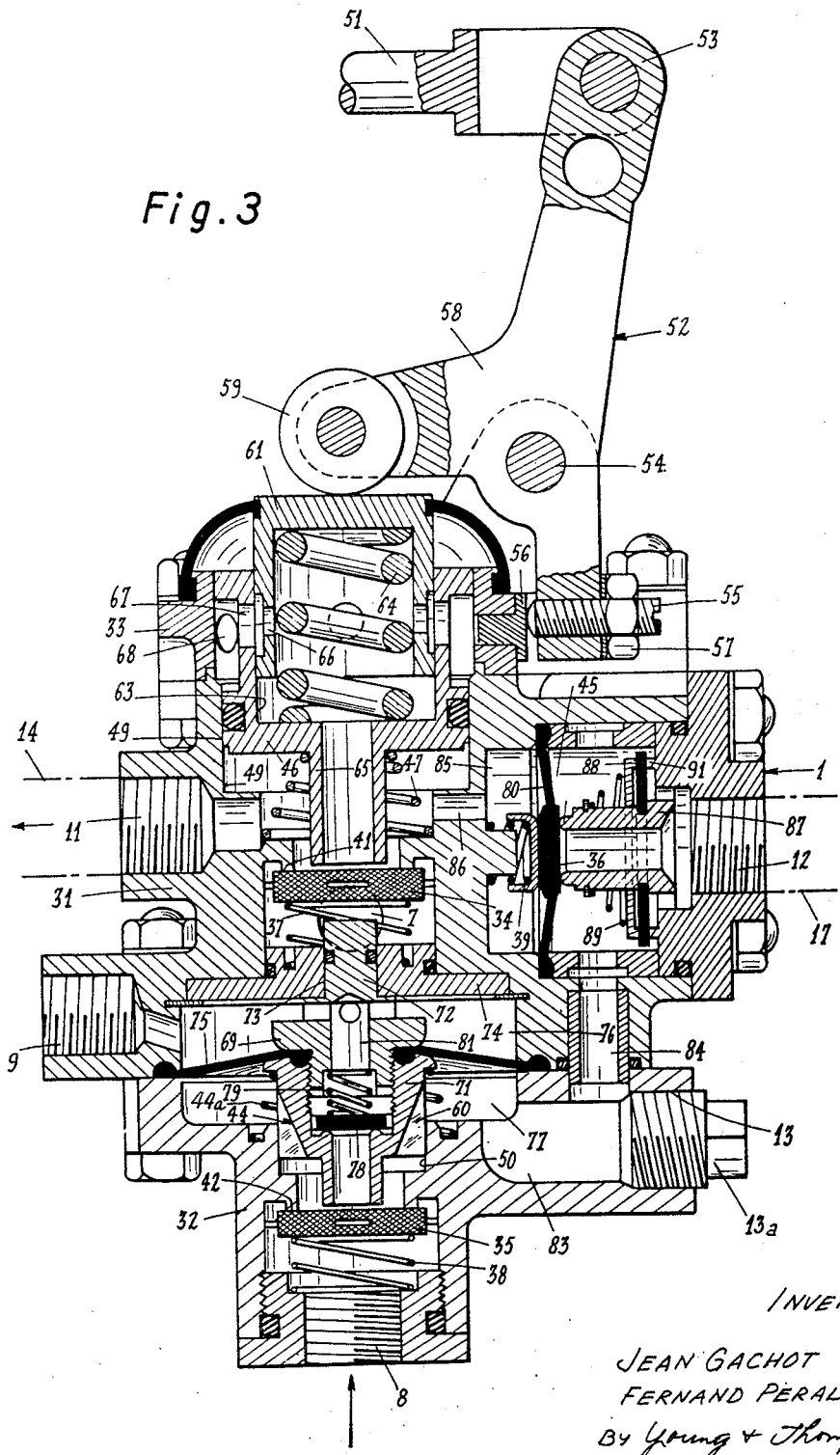
FIG. 3 is a longitudinal sectional view of the simple brake-actuating unit in the inoperative position of its two application circuits.

In the first embodiment of the invention, the simple brake system which is primarily intended for use in trucks having a rated weight of less than 16 tons and buses of less than 8 tons comprises a brake-actuating unit 1 which performs the function of distributor between the compressed-air supply system and the pneumatic brake components.

The compressed-air supply system essentially comprises a compressor 3 provided with a pressure regulator 4 which supplies in parallel two compressed-air reservoirs 5 and 6 respectively assigned to service braking and to emergency braking of the vehicle.

The brake-actuating unit 1 is provided with three compressed-air admission openings 7, 8 and 9. The reservoir 5 is connected to the admission opening 7. The reservoir 6, which may have a small capacity, is connected to the opening 8 and to the inlet of a pneumatic auxiliary control valve 2, the outlet of which is connected to the admission opening 9.

The actuating unit 1 comprises three discharge openings 11, 12, 13. The opening 11 is connected to the service application circuit 14 which supplies the brake cylinders 15 and 16 in parallel, said brake cylinders being respectively assigned to the rear and front sets of wheels. The opening 12 is connected to the emergency application circuit 17 which supplies the rear-wheel brake cylinders 15, said cylinders being fitted with two pistons which actuate a common brake rod in accordance with a known arrangement. In this version of the brake-actuating unit, the discharge opening 13 is closed off.

The brake system further comprises various known components such as check-valves 18 and the switching valves 19 which are mounted in series in the supply circuits of the air reservoirs 5 and 6, a double-indication pressure gage 21, a luminous signal lamp 22 connected to the storage battery 23 of the vehicle. The switching valves 19 in particular have the function of isolating from the air compressor any reservoir or circuit in which a leak may develop and as soon as the pressure therein falls below a predetermined value.

The simple brake-actuating unit 1 comprises essentially (as shown in FIG. 3) a central body 31, a base 32 and a cover 33 which are assembled by means of bolts in which are formed the three compressed-air admission openings 7, 8 and 9 and the three air discharge openings 11, 12 and 13; however, in this particular construction, the opening 13 is sealed off with respect to the actuating unit by means of a plug 13a.

The unit 1 is provided internally with three check-valves 34, 35, 36 which are respectively subjected to the controlling action of springs 37, 38, 39 which tend to apply said valves against their respective seats 41, 42, 43.

In the example of construction of FIGS. 3 to 6, the check-valves 34 and 35 are placed one above the other in coaxial relation and separated by an intermediate piston 44 which is subjected to the action of a controlling spring 44a. The check-valve 36 is located within a differential pressure chamber 45 which, in this example, is disposed laterally in a direction at right angles to the axis of the check-valves 34 and 35 and in immediate proximity to the discharge opening 12.

The check-valve 34 which is interposed between the compressed-air admission opening 7 connected to the reservoir 5 and the discharge opening 11 which supplies the service application circuit 14 is actuated mechanically by a master piston 46 which is coaxial with said check-valve. The master piston 46 is in turn subjected to the pressure of a controlling spring 47 and is slidably mounted with slight friction within coaxial bores 48 and 49 formed respectively in the cover 33 and in the central body 31 of the actuating unit 1.

The check-valve 35 can be opened mechanically by the master piston 46 via the check-valve 34 and the intermediate piston 44 or pneumatically by the intermediate piston alone. The check-valve 36 is actuated pneumatically. The valves 35 and 36 are mounted in cascade between the admission opening 8 which is connected to the reservoir 6 and the discharge opening 12 which supplies the emergency application circuit 17. A double obturation being thus interposed between the openings 8 and 12, emergency brake action canot be initiated as long as these two check-valves 35, 36 are not opened simultaneously. And this is possible, as will become apparent later, only on condition that the pressure of the service application circuit is lower than a predetermined value.

Control of the master piston 46 is carried out in known manner by means of the link-rod 51 which serves to couple the vehicle brake pedal (not shown in the figure) to one extremity 53 of a lever 52, said lever being pivoted about a stationary pin 54 which is rigidly fixed to the cover 33. The other extremity of the lever 52 is adapted to carry an adjustable stop consisting of a screw 55 applied against a wearing part 56 which is secured to the cover 33 and of a lock-nut 57. Said lever 52 is provided with a front arm 58 and with a runner-wheel 59 mounted at the extremity of this latter. Said wheel is intended to run along the end face 61 of an intermediate hollow piston 62 which is slidably mounted with slight friction within a bore 63 of the master piston 46 and subjected to the action of a controlling spring 64 which is fitted between the pistons 46 and 62.

A mechanism of this type makes it possible in known manner to subject the intermediate piston 62 to a multiple of the effort which is applied to the brake pedal and to displace the master piston 46 in a progressive manner in the direction of the first check-valve 34.

The master piston 46 terminates in the direction of the check-valve 34 in a tubular end-piece 65 of small diameter. In the inoperative position of the master piston 46, the extremity of the end-piece 65 is located at a small distance above the check-valve 34.

The intermediate piston 62, the master piston 46 and the cover 33 of the brake-actuating unit are provided with openings respectively designated by the reference numerals 66, 67, 68, whereby the compressed air contained in the cylinders 15 and 16 and in the service application circuit 14 and returned to the actuating unit 1 via the opening 11 after a brake application is vented to the atmosphere.

The intermediate piston 44 which actuates the check-valve 35 comprises two hollow elements 69, 71 which are screwed into each other. The upper element 69 terminates in a cylindrical end-piece 72 which is slidably fitted with slight friction and in leak-tight manner within a central bore 73 of a disc 74 which is stationarily mounted within the interior of the central body 31. The element 71 comprises a cylindrical shell which is adapted to slide within a bore 50 of the base 32, radial recesses 60 being cut in said element.

There is clamped between the hollow elements 69 and 71 a flexible diaphragm 75 having beaded edges which is additionally secured at its periphery between the body 31 and the base 32 of the brake-actuating unit. Said diaphragm 75 ensures a high degree of leak-tightness between the chambers 76 and 77 which are defined by said diaphragm and assists in guiding the piston 44 in the axial direction.

A check-valve 78 together with its controlling spring 79 is mounted within the interior of the piston 44. The valve 78 rests on the element 71 and the spring is applied against the element 69. A duct 81 which traverses the inner element 69 opens into the chamber 76 by way of ports 82.

The chamber 77 communicates via a chamber 83 and a duct 84 with the differential pressure chamber 45 which contains the third check-valve 36.

In the embodiment under consideration, the check-valve 36 consists of a flexible diaphrgam 80 which is reinforced in the central portion thereof and the periphery of which is secured between the outer wall of the differential pressure chamber 45 and the inner wall of the adjacent chamber 85 which communicates via an opening 86 with the bore 49 of the central body 31 in which the master piston 46 is slidably mounted and with the discharge opening 11 which is connected to the service application circuit 14.

The seat 43 of the third check-valve 36 is constituted by the extremity of an annular end-piece 37. Said end-piece is fitted externally with a flexible diaphragm 88 which is applied against a stationary seat 91 by means of a controlling spring 89. The valve thus formed permits the air which has been stored within the cylinders and the emergency application circuit to return through the actuating unit 1 and to escape to the atmosphere.

The operation of the simple brake-actuating system 1 is as follows:

(a) Inoperative position (FIG. 3). The driver of the vehicle does not produce any action either on the brake pedal or on the auxiliary control valve 2. The three check-valves 34, 35, 36 remain closed and no brake application takes place.

(b) Service application position (FIGS. 1 and 4). The driver exerts on the brake pedal a sufficient pressure to apply the end-piece 65 of the master piston 46 against the first check-valve 34 and to displace this latter mechanically from its seat 41. The master piston 46 is then located in its first operating position. The reservoir 5 supplies the service application circuit 14 via the admission opening 7, the first check-valve 34, and the discharge opening 11. The master piston 46 is then subjected to the same pressure as the service application circuit 14. If said pressure is normal, the opposing force applied by said pressure to the master piston 46 prevents any further travel of this latter. In consequence, the second check-valve 35 cannot be actuated. Moreover, the third check-valve 36 is in turn subjected to the pressure of the service application circuit which, in the absence of any back-pressure, firmly maintains said check-valve against its seat 43. There is therefore no danger of emergency brake application inasmuch as the check-valves 35 and 36 which are mounted in cascade are both closed.

In FIG. 1 and in the similar figures, the constant-pressure circuits are shown in heavy lines, the circuits which are subjected to the service pressure are shown in broken lines and the circuits which are at atmospheric pressure are shown in thin lines.

As soon as the driver releases the brake pedal, the master piston 46 returns to its inoperative position, the check-valve 34 closes again and the compressed air which has accumulated within the cylinders and within the service application circuit flows back through the opening 11 so as to escape to the atmosphere through the end-piece 65 which is disengaged from the check-valve 34 and through the openings 66, 67 and 68 which are provided for this purpose.

(c) Emergency application position (FIGS. 2 and 5). If the pressure of the service application circuit drops below a predetermined value such as 4 bars, for example, when the normal service pressure is 7 to 8 bars, the act of bringing the master piston 46 into its first operating position initiates a normal-service brake-application which is distinctly insufficient. Inasmuch as the forward travel of the master piston 46 is no longer limited, said piston can continue to move under the action of the brake pedal and reach its second operating position as illustrated in FIG. 5. There corresponds to this position a wide opening of the first check-valve 34 and a displacement of the second check-valve 35 from its seat which is carried out mechanically by the intermediate piston 44.

The opening of the second check-valve 35 which releases compressed air from the reservoir 6 has the effect of transmitting into the chamber 45 a pressure which is higher than the pressure existing within the chamber 85, with the result that the diaphragm 80 forces back the spring 39 and opens the check-valve 36. The reservoir 6 then supplies the emergency application circuit via the admission opening 8, the second check-valve 35, the third check-valve 36, and the discharge opening 12.

As soon as the driver releases the brake pedal, the master piston 46 returns to its inoperative position, the three check-valves 34, 35 and 36 close again and emergency brake action is immediately discontinued. The compressed air which has accumulated within the cylinders 15 and the emergency application circuit 17 again flows through the opening 12, lifts the edges of the flexible diaphragm 88 so as to penetrate into the differential pressure chamber 45, then passes through the duct 84, the chamber 83, the chamber 77, then penetrates into the interior of the element 71, lifts the valve 78, passes through the duct 81, through the lateral openings 82 and escapes to the atmosphere through the opening 9.

(d) Emergency application by means of the auxiliary control valve 2 (FIG. 6). In the event of accidental jamming of the brake pedal or failure of the link-rod system which connects said pedal to the brake-actuating unit 1, it is only necessary for the driver of the vehicle to operate the manual control valve 2 in order to connect the compressed air reservoir 6 to the air admission opening 9 which opens into the chamber 76 immediately above the flexible diaphragm 75. This initiates the pneumatic displacement of the intermediate piston 44, thereby causing the second check-valve 35 to open. The differential pressure chamber 45 is immediately put under pressure, with the result that, since the adjacent chamber 85 is at zero pressure, the third check-valve 36 is opened and the emergency application circuit 17 is supplied. After closure of the auxiliary control valve 2, the second check-valve 35 and the third check-valve 36 close immediately and the compressed air which has collected within the cylinders and the emergency application circuit passes out to the atmosphere along the path which has been indicated in the foregoing.

The two types of emergency brake application therefore effectively permit of integral braking action on the rear wheels.

A composite brake system as contemplated in FIGS. 7 and 8 is preferably employed in the case of vehicles having a rated weight of over 16 tons. This system comprises a brake-actuating unit 101 having six openings (7 to 12) with the three associated circuits, namely:

The service application circuit 102 for the rear wheels;

The service and emergency application circuit 103 for the front wheels;

The emergency application circuit 104 for the rear wheels.

More specifically, it is apparent from FIG. 7 that the opening 13 of the brake-actuating unit 101 is connected to a supplementary circuit 103 which carries out successively service brake-application and emergency brake-application at the front wheels. On the other hand, the circuit 102 which is connected to the opening 11 only carries out service brake-application at the rear wheels. The two reservoirs 5 and 6 which have comparable dimensions in this embodiment thus play a contributory part respectively in supplying the service application circuits of the rear and front wheels.

The composite brake-actuating unit 101 differs from the unit 1 especially in the following features (FIG. 10):

The base of the unit is constituted by a superposed assembly of three flat machined elements 111, 112, 113 which are rigidly coupled together by means of bolts 110.

The intermediate piston 114 which is intended to open the second check-valve 35 is mounted in such a manner that it can be actuated either mechanically by the master piston 46 for emergency brake application or pneumatically. Pneumatic control can be applied to the entire piston assembly (service applications) or to one of the piston elements (assisted emergency application). To this end, the piston 114 which is coaxial both with the master piston 46 and with the first and second check-valves 34 and 35 comprises two hollow elements 115 and 116 which are mounted to form a telescopic assembly.

The element 115 is constituted by two coaxial rings 118, 119 which are screwed one inside the other and between which is clamped the inner beaded edge of a flexible diaphragm 121, the peripheral beaded edge of which is clamped between the elements 111 and 112 of the base. The ring 118 is adapted to carry at its periphery an annular assembly of rods 117 which are slidably mounted with slight friction within axial bores formed in the central body 31 of the actuating unit 101. In the rest position, the rods 117 project into the interior of the bore 63 within which the master piston 46 is slidably mounted.

The hollow element 116 is in turn composed of two coaxial rings 122, 123 which are screwed one inside the other and between which is clamped the inner beaded edge of a second flexible diaphragm 124, the peripheral beaded edge of which is clamped by the elements 112 and 113 of the base.

The two flexible diaphragms 121 and 124 thus divide the space in which the intermediate piston 114 is adapted to move into three chambers 131, 132, 133 which are leak-tight with respect to each other.

The ring 122 is provided with a tubular end-piece 125 which is adapted to slide with slight friction and in leak-tight manner within the interior of the element 119 and within the bore 126 of a guide disc 127 which is stationarily mounted within the central body 31. Said end-piece is provided with lateral openings 128 which communicate with the bore 63 via a duct 129 which is formed in the central body 31 parallel to the bore 63 in which the master piston 46 is slidably mounted.

As with the simple actuating unit 1, a check-valve 78 and controlling spring 79 are mounted within the interior of the hollow element 123.

Figure 10:
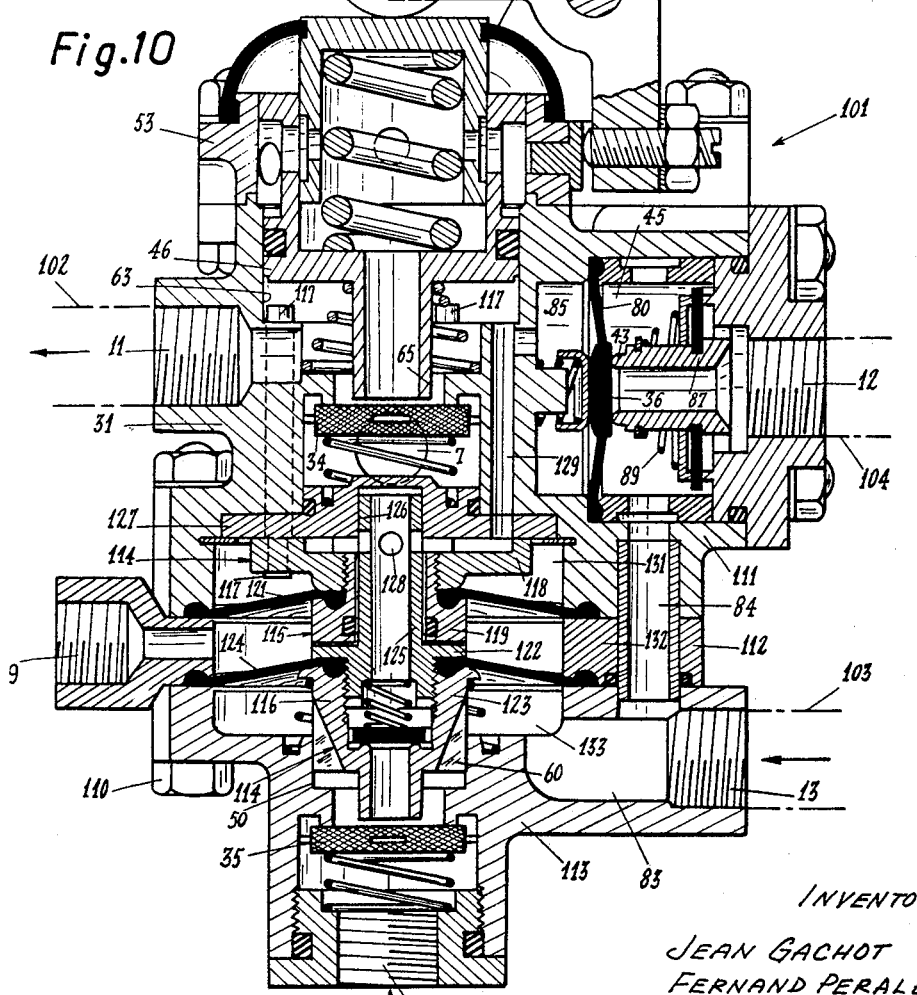
FIG. 10 is a longitudinal sectional view of the composite brake-actuating unit in the inoperative position of its three application circuits.

The operation of the composite brake system as thus constituted is as follows:

(a) Inoperative position (FIG. 10). The driver of the vehicle does not apply any pressure on the brake pedal or on the auxiliary control valve 2. The three check-valves 34, 35, 36 remain closed and no brake application takes place.

Figure 11:
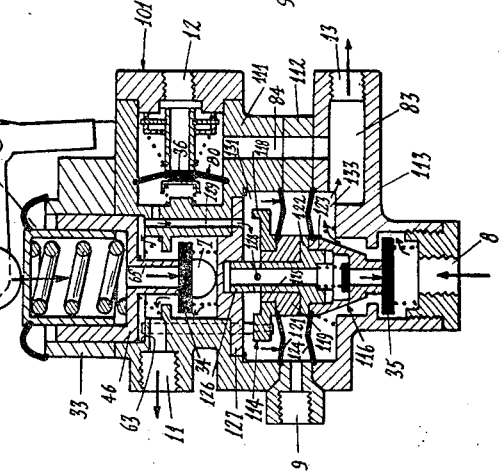
FIG. 11 is a more diagrammatic view in longitudinal section showing the same unit in the position of service application by means of the first and second circuits.

(b) Service application position (FIG. 11). The driver exerts on the brake pedal a sufficient pressure to apply the end-piece 65 of the master piston 46 against the first check-valve 34 and to displace this latter mechanically from its seat. The master pison 46 is then located in the first operating position thereof and is prevented from moving further by the opposing force applied thereto by the pressure of the reservoir 5 which supplies the service application circuit 102 (rear wheels). At the same time, the piston 114 is actuated pneumatically as a result of the pressure of the reservoir 5, whereupon the compressed air penetrates into the chamber 131 via the axial duct 129 and the openings 128. The piston 114 thus opens the check-valve 35 and the reservoir 6 supplies the service application circuit 103 (front wheels) by way of the opening 13. A slight time-lag occurs initially in this instance in the application of braking pressure on the front wheels, thereby dispensing with the need for so-called predominance valves or retardation valves. This is an important advantage of this composite brake system. As long as the pressure of the reservoir 5 is higher than the predetermied value, the third check-valve 36 remains closed.

Figure 12:
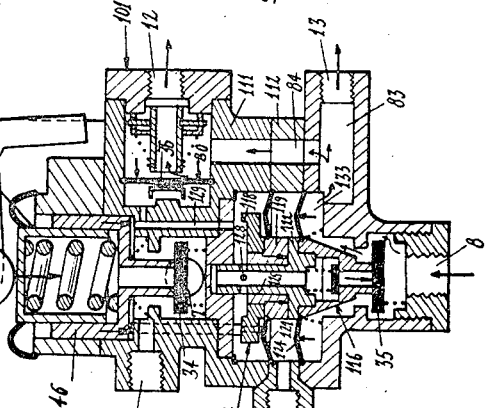
FIG. 12 is a longitudinal sectional view of the same unit in the position of emergency application by means of the second and third circuits.

(c) Emergency application position (FIGS. 8 and 12). If the service application pressure falls below said predetermined value, the driver of the vehicle moves the brake pedal into the second operating position, thereby initiating the mechanical displacement of the complete piston assembly 114 (as a result of application of the piston 46 against the rods 117) and initiates the opening of the second check-valve 35. The third check-valve 36 opens at the same time and the reservoir 6 supplies the emergency application circuits 103 and 104 (front wheels and rear wheels) via the openings 12 and 13.

Figure 13:
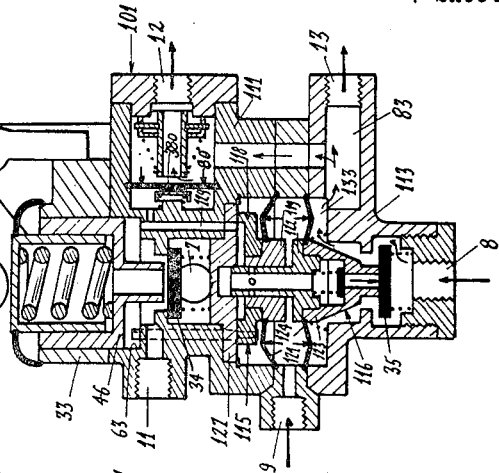
FIG. 13 is a partial longitudinal sectional view of the same unit in the position of emergency application by independent pneumatic control and by means of the second and third circuits.

(d) Position of emergency application by means of the control valve 2 (FIG. 13). In the event of jamming of the brake pedal or failure of the link-rod system which connects said pedal to the unit 101, the driver opens the manual control valve 2 which supplies the intermediate chamber of the element 132 with compressed air from the reservoir 6, thereby displacing the diaphragms 121 and 124 in opposite directions.

The element 115 of the piston 114 remains stationary. The element 116 moves away from the element 115, thereby opening the second check-valve 35 which causes the opening of the third check-valve 36 and the previous cycle starts again. The compressed air which has accumulated within the brake cylinders and application circuits is caused to return to the unit 101 by way of the same circuits as those which have been previously described.

The composite brake-actuating unit 101 has an advantage over known systems in that it applies a braking power to the rear wheels and to the front wheels which is comparable both during normal service and during periods of emergency operation.

In the case of brake application under normal conditions, the circuits which are provided ensure automatically a predominance of braking pressures on the rear wheels with respect to braking pressure on the front wheels, which is a particularly advantageous feature. It is also worthy of note that, in both embodiments, graduation is achieved in emergency brake application to the same extent as in service brake application.

Moreover, the differential pressure chamber 45 and its ancillaries—or time-delay chamber—prevents the pressure from being applied at the same time to the circuits 102 and 104 in the event of sudden brake application.

Figure 14:
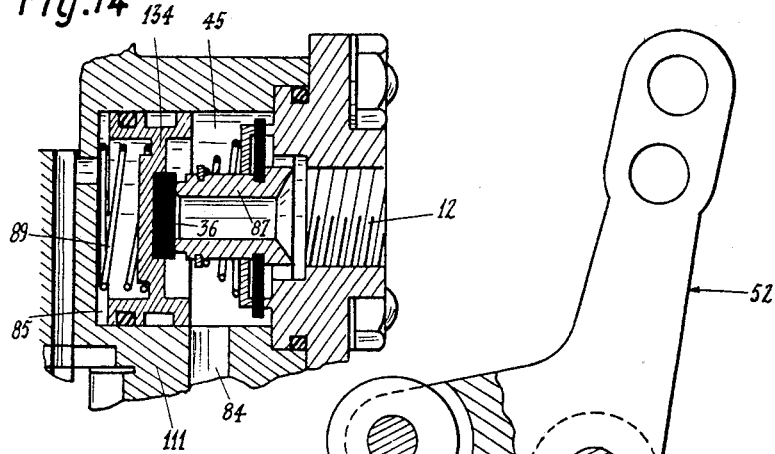
FIG. 14 is a longitudinal sectional view of the differential pressure chamber representing an alternative embodiment of the third check-valve.

It will be understood that a number of constructional modifications may be contemplated without departing from the scope of the invention. Accordingly, the flexible diaphragm 80 of the third check-valve 36 could be replaced by a piston 134 as is shown as an alternative embodiment in the longitudinal sectional view of the differential pressure chamber in FIG. 14.

Figure 9:
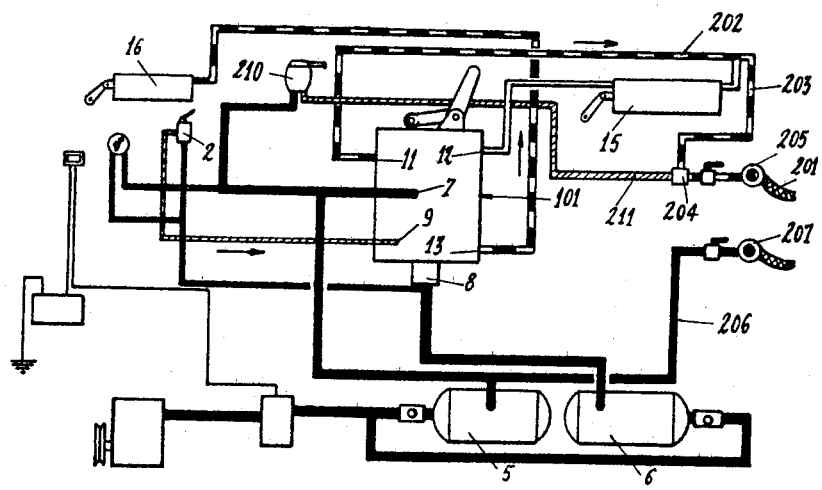
FIG. 9 illustrates the same brake system adapted to the brake-application circuits of a truck and of a trailer or semitrailer.

Similarly, the invention is applicable to the operation of brakes in trailers and semitrailers as shown in FIG. 9. In this case, use is made of a composite brake-actuating unit 101 which is similar to the unit described above and provision is made in the trailer (not shown in the drawings) for a direct brake-application circuit 201 which is connected as a shunt of the rear-wheel application circuit 202 by means of a pipe 203, a double check-valve 204 and a valved coupling head 205. The circuit 201 can also be supplied from a manual control valve 210, the inlet of which is connected to the reservoir 5 and the discharge pipe 211 of which terminates at the valve 204.

The automatic brake of the trailer or semitrailer is supplied from the reservoir 5 through a by-pass 206 and a coupling head 207.

What we claim is:

1. A compressed-air brake system for motor vehicles which comprises service application circuits for initiating brake application at the rear wheels and front wheels either in parallel or separately and an emergency application circuit for initiating brake application at least at the rear wheels, said system being additionally intended to comprise at least two separate reservoirs for supplying said circuits and a brake-actuating unit provided with a master piston actuated by the brake pedal and adapted to open mechanically in its first then in its second operating position two check-valves assigned to the service application and emergency application circuits, the second check-valve being intended to be opened mechanically by the master piston only if the pressure within the service application circuit falls below a predetermined value, characterized in that the brake-actuating unit comprises a third check-valve for admission of compresed air to the rear-wheel emergency application circuit, said third check-valve being controlled by the differential pressure between the service application circuit which is supplied from the first reservoir and the rear-wheel emergency application circuit which is supplied from the second reservoir.

2. A brake system in accordance wth claim 1, characterized in that the third check-valve is controlled by a flexible diaphragm constituting the movable wall of a differential pressure chamber formed in the brake-actuating unit, said diaphragm being subjected on one side to the pressure of the service application circuit which is supplied from the first reservoir and on the other side to the pressure of the emergency application circuit which is supplied from the second reservoir.

3. A brake system in accordance with claim 1, characterized in that the master piston of the brake-actuating unit is subjected in the first operating position thereof to the action of members which are controlled by the opposing pressure of the service application circuit and which prevent said master piston from reaching the second operating position thereof as long as the pressure of said circuit is higher than a predetermined value.

4. A brake system in accordance with claim 1, characterized in that the second check-valve is coaxial with the first check-valve and actuated mechanically by the master piston when said piston reaches the second operating position thereof by means of an intermediate piston which is subjected to the pressure of a controlling spring and supported within the chamber in which said intermediate piston is slidably mounted by means of a flexible diaphragm which ensures leak-tightness of said intermediate piston.

5. A brake system in accordance with claim 4, characterized in that it comprises a manual-control emergency brake valve which is supplied with compressed air from the second reservoir, the outlet of said control valve being connected to a supplementary admission opening of the brake-actuating unit for transmission of the air pressure from the second reservoir to the flexible diaphragm which supports the intermediate piston of the second check-valve so as to permit of solely pneumatic actuation of said second check-valve.

6. A brake system in accordance with claim 2, characterized in that the actuating unit comprises within the differential pressure chamber an annular end-piece which serves as a seat for the third check-valve, said end-piece being fitted externally with a flexible diaphragm which is applied by a controlling spring against a stationary seat, said diaphragm being adapted to permit after emergency brake application the discharge of the air under pressure which is contained in the brake cylinders and pipes.

7. A brake system in accordance with claim 1, characterized in that the intermediate piston of the second check-valve of the brake-actuating unit is hollow and provided within the duct formed within the interior of said piston with a check-valve which is subjected to the action of a controlling spring and adapted to permit after brake application the discharge of the air derived from the emergency brake cylinders and pipes which are supplied through the second check-valve.

8. A brake system in accordance with claim 1, characterized in that the brake-actuating unit is provided at the outlet of the second check-valve with a supplementary discharge opening for the separate supply of compressed air from the second reservoir to the front-wheel service application brake cylinders and that the brake-actuating unit is arranged so that the intermediate piston of the second check-valve is actuated pneumatically when the master piston is located in the first operating position thereof and mechanically by the master piston when said piston is located in the second operating position thereof, said two positions being such as to correspond respectively to service application and emergency application at the front wheels, the second check-valve being connected to single front-wheel brake cylinders by means of a single and same pipe.

9. A brake system in accordance with claim 8, characterized in that the intermediate piston of the second check-valve comprises two elements mounted to form a telescopic assembly and each adapted to carry a flexible sealing diaphragm, means being additionally provided for ensuring that the diaphragm located nearest to the first check-valve is subjected to the pressure of the service application circuit in the first operating position of the master piston.

10. A brake system in accordance with claim 8, characterized in that the brake-actuating unit comprises mechanical motion-transmission means such that the intermediate piston of the second check-valve is actuated mechanically by the master piston in the second operating position thereof.

11. A brake system in accordance with claim 9, characterized in that it comprises a manual-control emergency brake valve which is supplied with compressed air from the second reservoir, the outlet of said control valve being connected to a supplementary admission opening of the brake-actuating unit which communicates with the space formed between the two diaphragms so that the two telescopic elements of the intermediate piston may be moved away from each other and the second check-valve may be opened pneumatically.

References Cited

UNITED STATES PATENTS

| | | | |
|---|---|---|---|
| 3,309,149 | 3/1967 | Bueler | 303—13 |
| 3,443,839 | 5/1969 | Hinrichs et al. | 303—13 |

MILTON BUCHLER, Primary Examiner

J. J. McLAUGHLIN, JR., Assistant Examiner

U.S. Cl. X.R.

303—2, 13, 28, 40, 53, 54